United States Patent [19]
Irwin

[11] 3,913,883
[45] Oct. 21, 1975

[54] MEANS FOR SECURING FLEXIBLE DIAPHRAGM IN FLUID ACTUATOR FOR VALVES

[75] Inventor: Richard C. Irwin, Sugarland, Tex.

[73] Assignee: ACF Industries, Incorporated, New York, N.Y.

[22] Filed: Sept. 3, 1974

[21] Appl. No.: 502,325

[52] U.S. Cl. .................... 251/25; 92/128; 137/236; 251/63.6
[51] Int. Cl.² .................... F16K 31/12; F16K 43/00
[58] Field of Search ............ 251/14, 62, 63.5, 63.6, 251/282, 331, 25; 137/315, 316, 236; 92/96, 128; 277/101, 147, 182, 128

[56] References Cited
UNITED STATES PATENTS
3,379,405  4/1968  Natho .............................. 251/63.6
3,466,001  9/1969  Nelson .............................. 251/63.6

Primary Examiner—Martin P. Schwadron
Assistant Examiner—George L. Walton
Attorney, Agent, or Firm—Richard M. Byron

[57] ABSTRACT

Means to secure and seal the flexible diaphragm in a generally cylindrical hydraulic fluid actuator of a gate valve in which an outer longitudinally movable shroud member is positioned outwardly of the flexible diaphragm. The hydraulic fluid actuator is single acting and the flexible diaphragm provides a pressure balancing chamber particularly desirable for a subsea environment. The shroud fits between a pair of end members of the fluid actuator and facing annular grooves are provided on the end members and shroud member. The marginal end portions of the flexible diaphragm are positioned adjacent the grooves and a flexible band urged against the flexible diaphragm grips the diaphragm about the end members and simultaneously locks the shroud member to the end members.

6 Claims, 5 Drawing Figures

FIG.2
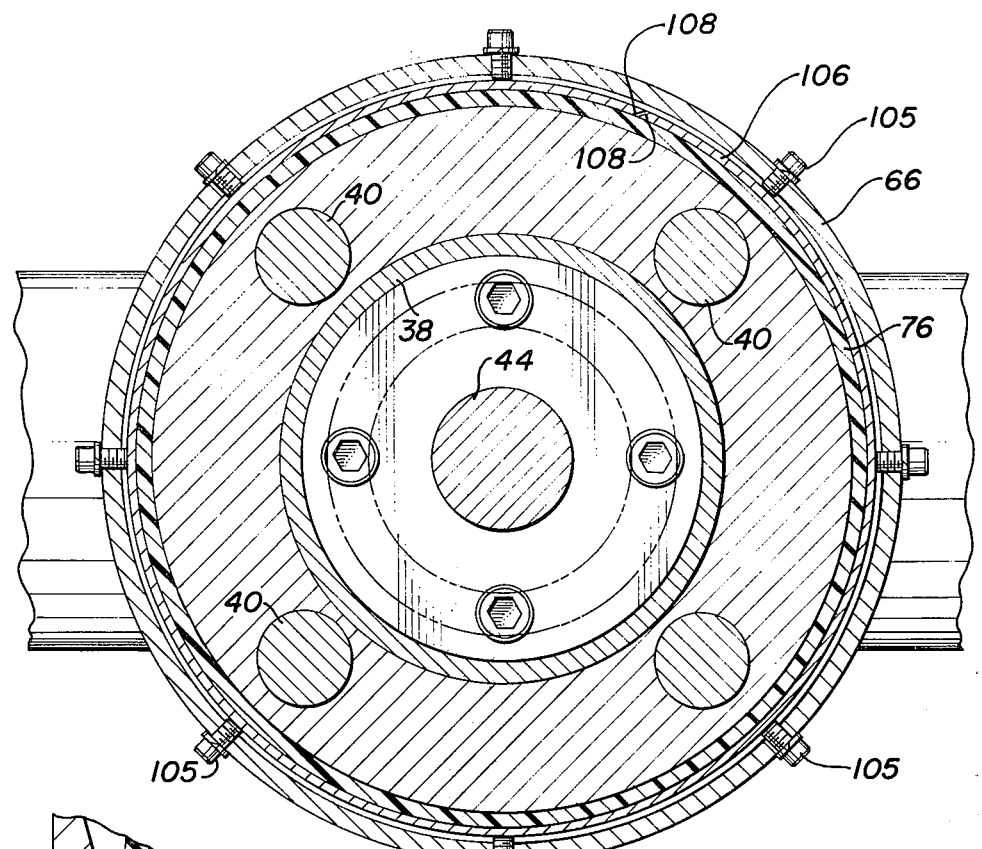
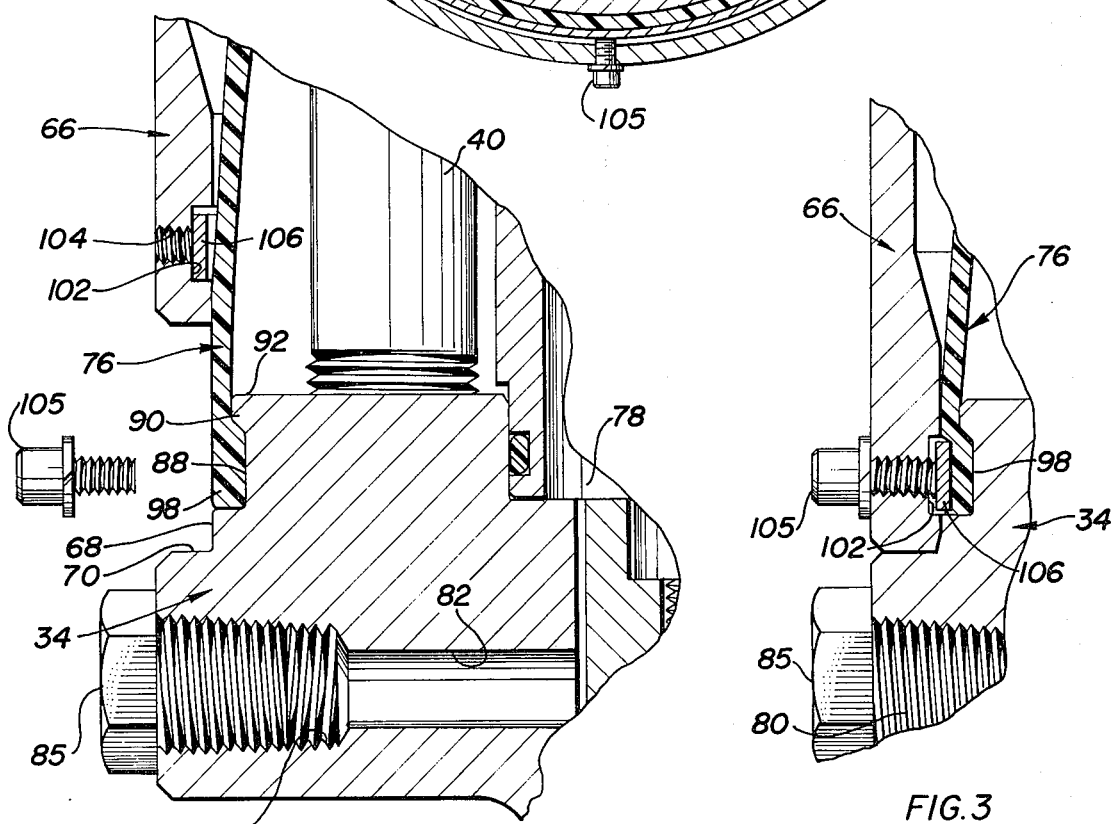
FIG.4
FIG.3

MEANS FOR SECURING FLEXIBLE DIAPHRAGM IN FLUID ACTUATOR FOR VALVES

BACKGROUND OF THE INVENTION

Heretofore, such as shown in U.S. Pat. No. 3,466,001 dated Sept. 9, 1969, a gate valve actuator assembly has been provided in which a shroud member has been employed to secure a flexible diaphragm in position between opposed end members of the hydraulic fluid actuator. A fluid actuator assembly employing a flexible diaphragm is used particularly in subsea operation with the flexible diaphragm serving to transmit hydrostatic pressure from the environment surrounding the valve to the hydraulic fluid located within the fluid chamber of the actuator so that a balanced pressure is maintained between the fluid for actuating the valve and the hydrostatic head. As a result of this, the shroud and other protected structures of the operator mechanism may be constructed of relatively light material since they will not be subjected to the effect of severe hydrostatic pressures in subsea areas.

The flexible diaphragm which is exposed to the hydrostatic pressures has been secured heretofore by the shroud member slipping over the diaphragm and squeezing the end portions of the diaphragm against the adjacent end members. While grooves were provided to receive the end portions of the diaphragm upon the movement of the shroud member, it was difficult to provide an adequate gripping of the end portions adjacent the grooves as the shroud member had to fit over the diaphragm when slipped downwardly. Thus, it was difficult at times to determine if the flexible diaphragm was sealed positively until hydraulic fluid was actually pumped into the actuator.

DESCRIPTION OF THE PRESENT INVENTION

The present invention is directed to means for positively sealing and securing the marginal end portions of the flexible diaphragm against the adjacent end members of the hydraulic actuator and insures that the diaphragm is secured within the adjacent grooves. Each of the end members has an annular groove facing outwardly therein and the shroud member which fits over and slides downwardly over the end members has an inwardly facing opposed annular groove adjacent each end. A flexible split ring is positioned within the annular grooves on the shroud member and upon movement of the shroud member into seated position for securing the flexible diaphragm the split ring members are disposed adjacent the grooves in the opposed end members. Threaded retaining studs carried by the shroud member are threaded inwardly against the split ring members to urge the split ring members against the diaphragm for gripping the diaphragm against the end members. Inward movement of the outer split ring member releasably secures the shroud member in position and prevents the shroud member from being slipped off the associated end member. For removing the shroud member or diaphragm, the threaded screws may be withdrawn with the split rings returning within the grooves of the shroud member to permit the shroud member to slide off the end members.

A preferred embodiment of the invention has been chosen for purposes of illustration and description and is shown in the accompanying drawings, forming a part of the specification, wherein:

FIG. 2 is a section taken generally along line 2—2 of FIG. 1 and showing the flexible diaphragm in secured position between the shroud member and the inner end member of the hydraulic actuator;

FIG. 3 is an enlarged fragment of FIG. 1 illustrating the lower marginal end portion of the flexible diaphragm in secured position between the shroud member and the adjacent inner end member;

FIG. 4 is a fragment generally similar to FIG. 3 but showing the shroud member in a position before being assembled over the flexible diaphragm for securing the diaphragm on the inner end member; and FIG. 5 is an enlarged fragment of FIG. 1 showing the securing means for the flexible diaphragm on the outer end member.

Figure 1:
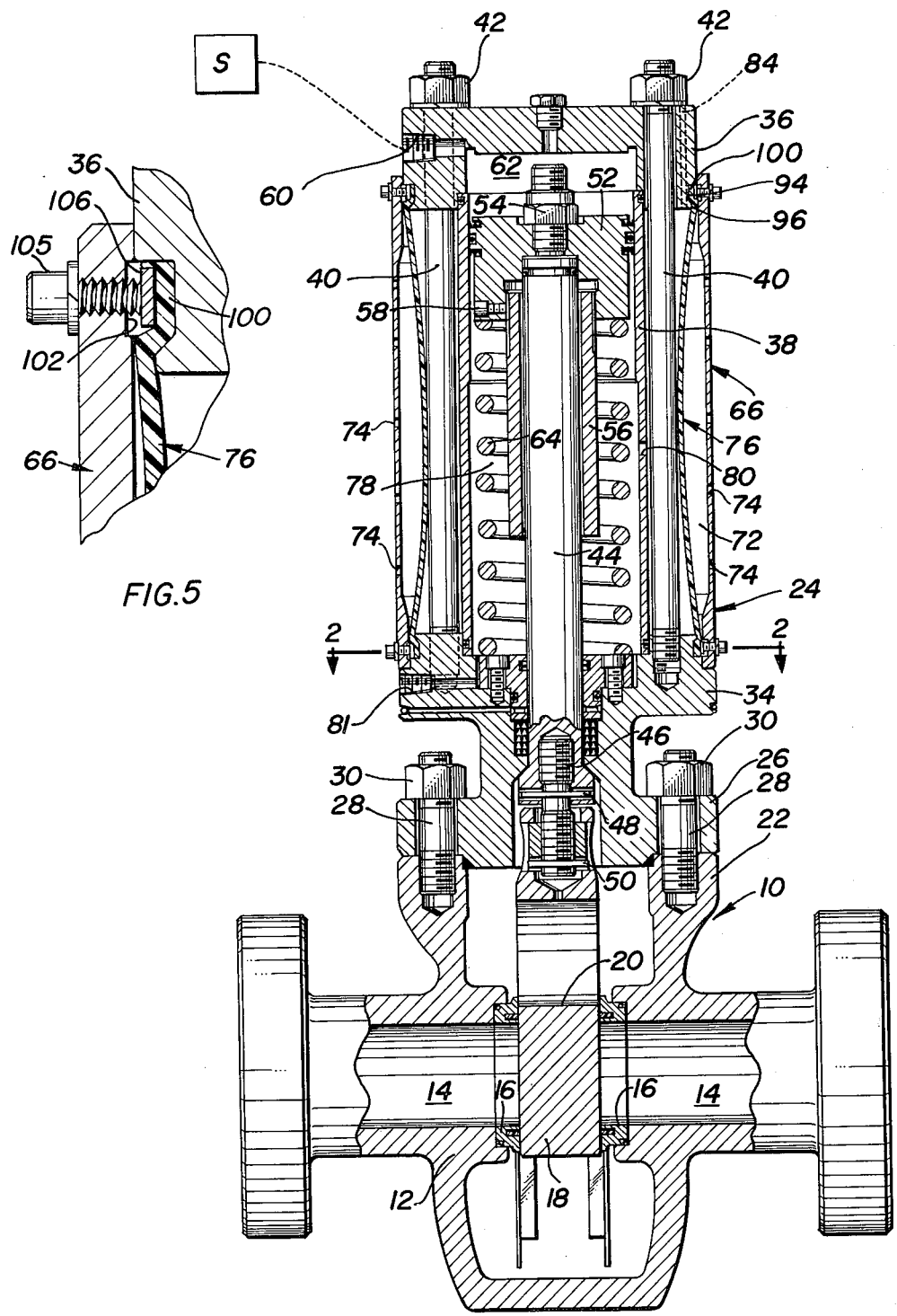
FIG. 1 is a vertical sectional view of the valve and actuator assembly incorporating the diaphragm and shroud member forming the present invention.

Referring to the drawings for a better understanding of this invention, a valve is generally indicated at 10 having a valve body 12 with a flow passage 14 therethrough. Seat assemblies 16 are mounted within valve body 12 and a gate valve member indicated at 18 fits between seat assemblies 16. Gate valve 18 has an opening 20 which is adapted to align with flow passage 14 in the open position of valve 10. FIG. 1 shows gate valve 18 in a closed position. Valve body 12 has an upper flange 22 and a single acting valve actuator assembly generally indicated at 24 has a lower flange 26 secured to flange 22 by suitable studs 28 and nuts 30. The lower body portion of valve actuator assembly 24 has a lower flange 26 and a lower end cap member 34. Mounted between an upper end cap member 36 and lower end member 34 is a hydraulic cylinder 38. A plurality of tie rods 40 have their lower ends secured to lower end member 34 and extend through suitable openings in upper end member 36. Nuts 42 secure end members 34 and 36 in tight engagement with hydraulic cylinder 38.

A gate valve stem 44 has its lower end threaded onto an externally threaded connector 46 and secured thereto against rotation by pin 48. Gate valve member 18 has its upper end portion threaded onto connector 46 and secured by pin 50 thereto. Thus, gate valve member 18 reciprocates with stem 44. Secured to the upper end of stem 44 by nut 54 is a piston 52 mounted for movement within hydraulic cylinder 38. An adjustable stop 56 is carried by piston 52 and is suitably adjusted by set screw 58. Stop 56 engages the inner surface of end member 34 upon downward movement of piston 52 to the open position of gate valve 18.

Hydraulic fluid from a suitable source S is supplied under pressure through opening 60 to hydraulic fluid chamber 62 adjacent the outer end of piston 52 for movement of piston 52 downwardly to the open position of gate valve 18. A coil spring 64 is mounted within hydraulic cylinder 38 between the inner end of piston 52 and the adjacent inner surface of lower end member 34 to urge continuously piston 52 to the upper position shown in FIG. 1. Spring 64 thus acts to return gate valve 18 to the closed position upon release of fluid pressure from chamber 62.

The present invention is particularly adapted for use in a subsea or underwater environment and it is desirable particularly in water of considerable depth to have a pressure balancing chamber to overcome the hydrostatic head of chamber 62. For this purpose, a removable shroud member generally indicated at 66 extends between end cap members 34 and 36. Lower end cap member 34 has an annular groove 68 and a bottom ledge 70 forms a seat for shroud member 66 in its secured position. An annular chamber 72 is formed between shroud member 66 and hydraulic cylinder 38, and openings 74 in the wall of shroud member 66 permit seawater to enter chamber 72. A flexible diaphragm generally indicated 76 is mounted within chamber 72 and serves to transmit the hydrostatic pressure from the seawater surrounding actuator 24 as will be explained. The fluid balancing chamber is formed by chamber 72 inwardly of diaphragm 76 and by inner chamber 78 of hydraulic cylinder 38 beneath piston 52. Fluid communication is provided between chamber 78 and annular chamber 72 through port 80 in the wall of hydraulic cylinder 38. To provide fluid within chamber 72 inwardly of diaphragm 76 and chamber 78, an opening 81 is provided in end member 34 and communicates with a passage 82 in fluid communication with chamber 78. When filling chambers 72 and 78 with fluid, any air may be purged through port or passage 84 which may be plugged with a suitable plug after the air is purged. A suitable plug 85 is likewise fitted within opening 81 after the balancing fluid has been placed within chambers 72 and 78 inwardly of diaphragm 76.

As shown in FIG. 1, gate valve 18 is in a closed position and piston 52 is in its outer position with diaphragm 76 shown at an innermost position. Upon movement of gate valve 18 to an open position and the inward movement of piston 52, fluid within chamber 78 is forced outwardly through port 80 into chamber 72 to move flexible diaphragm 76 outwardly. Thus, annular chamber 72 in effect acts as a reservoir for the fluid within the lower portion of hydraulic cylinder 38. The flexible diaphragm 76 serves to transmit the hydrostatic pressure from the seawater surrounding actuator 24 so that a balanced pressure may be maintained on opposite sides of piston 52 between the balancing fluid and any hydrostatic head acting on chamber 62. This feature allows shroud member 36 and other protective structures of actuator 24 to be constructed of relatively light material since they will not be subjected to the effects of severe hydrostatic pressures. Seawater or any other fluid medium in which actuator 24 is located will be forced outwardly by flexible diaphragm 76 through ports 74 thereby preventing a rise in internal pressure within the enclosed fluid chambers 72 and 78. It is apparent therefore that through the use of flexible diaphragm 76 fluid may be transferred from chamber 78 to chamber 72 without changing the fluid pressure therein.

The present invention is directed to means for securing flexible diaphragm 76 within chamber 72. Flexible diaphragm 76 is mounted between end cap members 34 and 36. Lower end cap member 34 has an inwardly stepped annular groove 88 forming an annular rim or lip 90 adjacent surface 92 of end cap member 34. Outer end cap member 36 has an outwardly facing annular groove 94 forming an inner lip or rim 96. Flexible diaphragm 76 has enlarged marginal end portions 98 and 100. Shroud member 24 has upper and lower inwardly facing grooves 102 therein disposed adjacent grooves 88 and 94. A plurality of threaded openings 104 communicate with grooves 102 and are adapted to receive threaded retaining studs 105 therein. Fitting within grooves 102 are split metal bands or rings 106 having spaced ends 108 as shown in FIG. 2. For securing diaphragm 76, shroud member 66 having metal rings 106 within grooves 102 is slipped inwardly over diaphragm 76 which has been positioned with marginal end portions 98 and 100 fitting within grooves 88 and 94. After shroud 66 is seated on ledge 70 threaded studs 105 are threaded inwardly against rings 106 urge rings 106 inwardly for gripping end portions 98 and 100 of diaphragm 76 tightly against end cap members 34 and 36. Ring 106 adjacent outer end member 36 when in secured position as shown in FIG. 5 holds shroud member 66 against outward movement by contact with adjacent end member 36. To remove shroud member 66, retainer studs 105 are withdrawn from contact with rings 106 and rings 106 expand within grooves 102 to permit shroud member 66 to be slipped outwardly.

The present invention thus positively seals and secures end portions 98 and 100 of flexible diaphragm 76 to insure that diaphragm 76 is maintained in position within adjacent grooves 88 and 94. Further, the securing means for diaphragm 76 releasably secures movable shroud member 66 in position.

What is claimed is:

1. A valve and valve actuator assembly comprising, a valve body defining a valve chamber and a fluid passage in communication with the valve chamber, a gate valve mounted within the valve chamber, a stem connected to the gate valve, and a fluid actuator mounted on the valve body for moving said stem and gate valve between open and closed positions, said fluid actuator including a piston connected to said stem, an inner hydraulic cylinder in which the piston is mounted for movement and having opposed end members of a diameter greater than the diameter of said cylinder, said inner cylinder having a hydraulic fluid pressure chamber adjacent the outer side of the piston and a spring adjacent the inner side of the piston to return the piston and gate valve to a closed position, means to supply hydraulic fluid to said fluid pressure chamber to move the piston and gate valve to an open position, an outer cylindrical shroud member mounted on said end members in concentric relation to the hydraulic cylinder and forming an annular chamber between the inner cylinder and shroud member, said shroud member fitting about the outer end member and seating on the inner end member, a diaphragm disposed within the annular chamber adjacent the shroud member and forming a pressure balancing chamber for the inner side of said piston, means providing fluid communication between the annular chamber and the hydraulic cylinder on the inner side of the piston, means communicating the fluid pressure of the fluid medium in which the actuator is positioned outwardly of the flexible diaphragm, each of said end members having an annular outwardly facing groove therein and said shroud member having an opposed inwardly facing groove therein adjacent each end of the shroud member, annular gripping means positioned within each of said shroud member grooves, and means to move the gripping means inwardly when the shroud member is seated on said inner end member to grip the marginal end portions of said flexible diaphragm tightly against the opposed grooves in the end members.

2. A valve and valve actuator assembly as set forth in claim 1 wherein said annular gripping means comprises a resilient band in each of said shroud member grooves having separated opposed ends.

3. A valve and valve actuator assembly as set forth in claim 2 wherein radially spaced threaded openings are in communication with each of said shroud member grooves, and said means to move the resilient bands inwardly comprises studs threaded within said threaded openings and pressing the bands inwardly against the flexible diaphragm.

4. A valve and valve actuator assembly as set forth in claim 2 wherein said annular gripping means comprises a resilient band in each of said shroud member grooves and said means to move the gripping means inwardly contacts the resilient band for the outer end member and moves the resilient band within the associated groove on the outer end member, said resilient band when positioned within said associated groove on the outer end member abutting the adjacent surface defining said groove and thereby preventing outward movement of said shroud member.

5. A valve and valve actuator assembly comprising, a valve body defining a valve chamber and a fluid passage in communication with the valve chamber, a gate valve mounted within the valve chamber, a stem connected to the gate valve, and a fluid actuator mounted on the valve body for moving said stem and gate valve between open and closed positions, said fluid actuator including a piston connected to said stem, an inner hydraulic cylinder in which the piston is mounted for movement and having opposed end members of a diameter greater than the diameter of said cylinder, said inner cylinder having a hydraulic fluid pressure chamber adjacent the outer side of the piston and a spring adjacent the inner side of the piston to return the piston and gate valve to a closed position, means to supply hydraulic fluid to said fluid pressure chamber to move the piston and gate valve to an open position, an outer cylindrical shroud member mounted on said end members in concentric relation to the hydraulic cylinder and forming an annular chamber between the inner cylinder and shroud member, said outer shroud member fitting about the outer end member and seating on the inner end member, a diaphragm disposed within the annular chamber adjacent the outer shroud member and forming a pressure balancing chamber for the inner side of said piston, means providing fluid communication between the annular chamber and the hydraulic cylinder on the inner side of the piston, means communicating the fluid pressure of the fluid medium in which the actuator is positioned outwardly of the flexible diaphragm, each of said end members having an annular outwardly facing groove therein and said shroud member having an opposed inwardly facing groove therein adjacent each end of the shroud member, said shroud member having a plurality of radially spaced threaded openings communicating with each of the inwardly facing grooves, a resilient band with separated ends mounted within each of the inwardly facing grooves, and studs threaded within said openings when the shroud member is seated on said inner end member contacting and pressing said bands tightly against the flexible diaphragm and the adjacent end members.

6. A valve and valve actuator assembly as set forth in claim 5 wherein said resilient band adjacent the outer end member when positioned within the adjacent groove for the outer end member prevents outward movement of said shroud member.

* * * * *